Sept. 22, 1931.      R. MUHLICHEN      1,824,562
ARTICLE HOLDER
Filed April 30, 1931
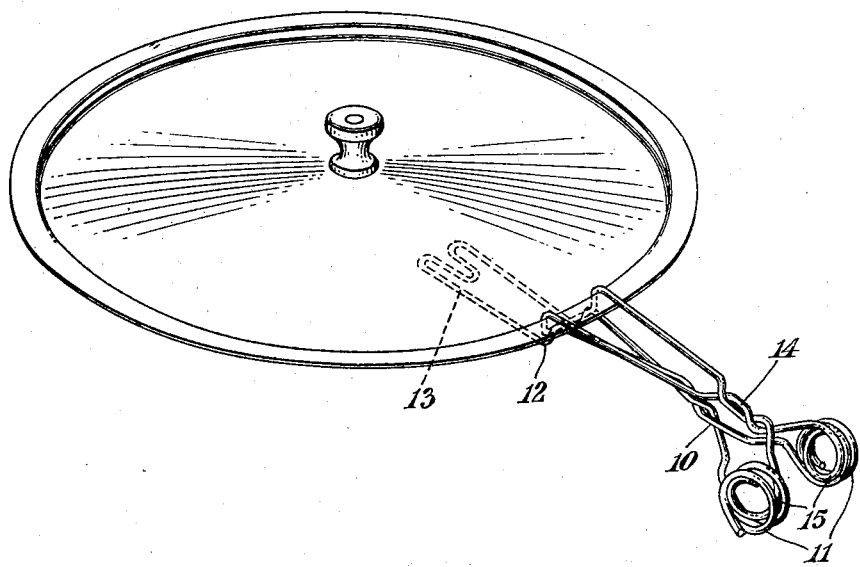
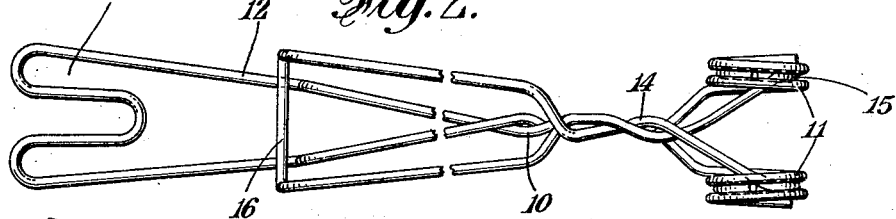
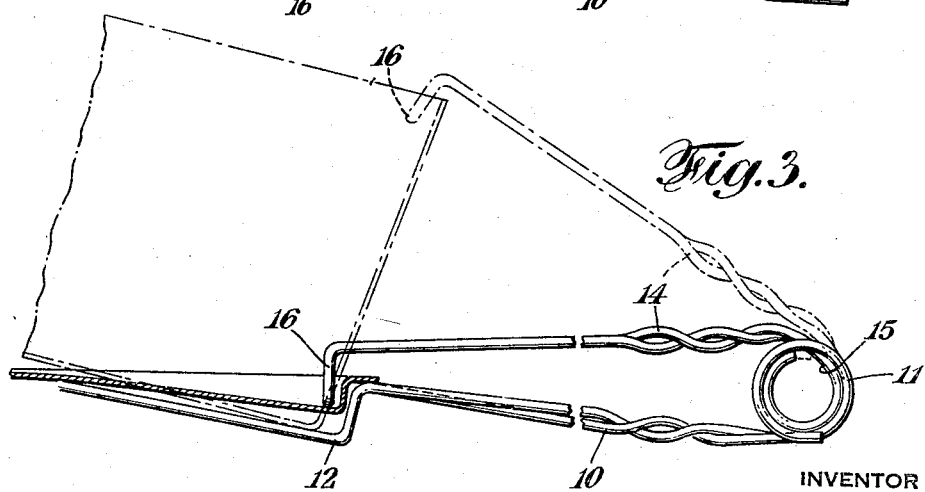
INVENTOR
Rudolf Muhlichen.
BY
his ATTORNEY Patented Sept. 22, 1931

1,824,562

UNITED STATES PATENT OFFICE

RUDOLF MUHLICHEN, OF HOBOKEN, NEW JERSEY

ARTICLE HOLDER

Application filed April 30, 1931. Serial No. 533,896.

This invention relates to article holders, in general, and particularly to the kind for holding, lifting, replacing and arranging hot cooking utensils of any description, form, size or weight.

One of the objects of my invention is to provide a simple, inexpensive and practical article holder adapted for gripping and firmly holding pot covers, dishes, pans, pots, etc., so designed that no matter how high or thin the article to be handled may be, the holder will adjust itself to securely engage it.

A further object of my invention is to so construct such article holder that one of its ends forms a hinge connection composed of interengaging wire loops adapted to permit the two members of the article to open or close over their full length, thereby facilitating their adjustment to any desired degree.

Still another object of my invention is to so construct the gripping ends of my device, that one member thereof may serve as underlying or supporting element, while the other member is constructed as overlying or holding element for engaging the top edge or surface of any article to be held.

The foregoing and still further objects will become more fully apparent from the following description and the accompanying drawings, forming part of my disclosure, but by no means intended to limit my invention to the actual showing, and in which Fig. 1 illustrates one of the many possible forms of my device holding a pot cover;

Fig. 2 is a top view of my device, and

Fig. 3 is a side elevation thereof, showing in full lines the nearly closed position of the two holder members engaging a pot cover, and in broken lines the holding member partially open and engaging the upper edge of a pan.

Referring now to the figures, numeral 10 denotes the underlying or supporting member of my device, at one end of which is provided a pair of double loops 11, the turns of which are somewhat spaced. The other end of member 10 is provided with a recessed or stepped-down extension 12 terminating in a bifurcated semi-looped resting or engaging formation 13, adapted to slip under an article to be held by my device.

The upper or overlying member 14 of my device is provided with a pair of single loops 15 at one end, while the other end is formed into a hook-shape 16, adapted to register with the recessed portion of extension 12 of the lower member.

It will be observed that the single loops 15 of the upper member engage the double loops 11 of the lower member so that the spaces between the turns of the double loops form seats and guides for the single loops. This construction results in an interhinged connection between the two members, and each member may swing from the other to any desired degree, thereby facilitating the holding of articles of any desired height.

The portions of each member connecting the hinge ends with the engaging ends are preferably reinforced by twisting the wires, from which the members are preferably formed. It is obvious that the distance between the loops and engaging ends may be altered for increasing or decreasing the amount of opening desired between the two members. The reinforced portions serve as handles for the device, although heat insulating coverings (not shown) may be provided with these portions, if desired.

While I have shown only one specific construction of my device made of wire, it is self-evident that other material may be employed in its manufacture and its arrangement changed accordingly, without departing from the broad idea of my invention of hinging the two members at one end, as described, or in other similar manners.

I therefore reserve for myself the right to make changes and improvements in my invention as they may become necessary when employed for various uses, without departing from the broad spirit of my disclosure as set forth in the annexed claims.

I claim:—

1. An article holder, comprising two members having looped ends hingedly connected at these ends and adapted to independently swing from or towards one another over their entire length for the purpose described.

2. An article holder, comprising two members, a looped hinge connection provided at one end of each member and adapted to connect them at that end, permitting each of the members to swing from or against one another to any desired degree, the free ends of said members provided with article engaging means.

3. An article holder, comprising two wire formed members having coiled ends forming hinge connections for the members, their free ends provided with means for gripping articles of any desired height.

4. An article holder, comprising two wire formed members, one serving as underlying or supporting element, the other serving as overlying or holding element, one of the elements having two multiple full loops at one end, the other element having two single loops at one end, said single loops of the other element in interengagement with the multiple loops of the first element and comprising hinged connections for both elements.

5. An article holder, comprising wire formed members, one serving as underlying or supporting element, the other serving as overlying or holding element, loops formed at one end of each element and forming hinged interengagements for said elements, the free ends of the elements having article engagement provisions, said elements adapted to fully open or close in respect to one another.

6. In an article holder, as set forth in claim 5, the loops of one element comprising a pair of double turns of wire, the loops of the other element comprising a pair of single turns adapted to operate in the spaces between the double turns of the first element.

In testimony whereof I affix my signature.

RUDOLF MUHLICHEN.